United States Patent Office 3,117,060
Patented Jan. 7, 1964

3,117,060
16-METHYLENE-TESTOSTERONE DERIVATIVES
Klaus Bruckner, Klaus Irmscher, Ulrich Jahn, Harald Metz, and Josef Gillissen, all of Darmstadt, Germany, assignors to Firma E. Merck Aktiengesellschaft, Darmstadt, Germany
No Drawing. Filed July 14, 1961, Ser. No. 123,993
8 Claims. (Cl. 167—74)

This invention relates to the preparation of novel steroid compounds having a high anabolic activity and a low androgenic activity.

An anabolic agent, sometimes called a myotrophic agent, promotes storage of protein and generally stimulates tissues. These agents are useful for the treatment of persons debilitated by various metabolic and endocrine disorders. Unfortunately, though, the utilization of many of these agents for debilitated females has been hampered by an androgenic effect that is associated with the anabolic agents. A classical example of an anabolic agent having an excessive androgenic activity is testosterone.

It is appreciated, however, that a great deal of effort has been expanded to upgrade the anabolic/androgenic activity of testosterone; and that improved steroids have been prepared, such as 17alpha-methyl-5-androstene-3beta,17beta-diol. These new compounds, though better, still leave room for improvement as in many cases, the anabolic activity is too low, and the androgenic activity is too high. Consequently, there is a need for agents having a high anabolic activity and a low androgenic activity.

The object of this invention is to provide new steroid compounds having a high anabolic activity and a low androgenic activity.

Another object of this invention is to provide novel intermediates for the preparation of new steroids, which new steroids can in turn be utilized as intermediates for the preparation of still further new steroids.

Still another object of this invention is to provide novel processes for the preparation of novel intermediates and novel steroid compounds having a high degree of anabolic activity and a low degree of androgenic activity.

Upon further study of the specification and appended claims, other advantages and objects of the present invention will become apparent.

To attain the objects of this invention, it has been unexpectedly discovered that by the incorporation of a methylene substituent at the 16 position of the steroid 17alpha-methyl-5-androstene-3beta,17beta-diol, the anabolic activity of the steroid is markedly enhanced, while simultaneously the androgenic activity is decreased, thereby resulting in a highly favorable anabolic/androgenic ratio. Furthermore, it was discovered that the incorporation of this 16-methylene group also results in a more favorable anabolic/androgenic ratio in other steroids. As typical examples of the novel 16-methylene steroids of this invention, there are included:

16-methylene-17alpha-methyl-5-androstene-3beta,17beta-diol,
16-methylene-17alpha-methyl-testosterone,
16-methylene-17alpha-methyl-1-dehydro-testosterone,
16-methylene-17alpha-methyl-testosterone-3-oxime, and
16-methylene-17alpha-methyl-1-dehydro-testosterone-oxime.

In addition to the improved anabolic/androgenic ratio of the aforementioned compounds, these novel steroids can be used as intermediates in the preparation of still further novel steroids being therapeutically useful.

To demonstrate the improved anabolic/androgenic ratios of the 16-methylene compounds of this invention, reference is made to the following table wherein the anabolic/androgenic ratios of the 16-methylene compounds are compared to the same compounds devoid of the 16-methylene substituent.

The anabolic/androgenic ratios thus obtained are compared to the well known anabolic compound methyl-testosterone the ratio of which is fixed to 1. The trials were conducted according to the commonly used method of Hershberg et al. described in Proceedings Soc. of Exp. Biol. Med. volume 83, page 175 (1953), the dose being 10 mg. per rat.

The following data were obtained:

| Compound: | Ratio of anabolic/androgenic activity |
|---|---|
| 16 - methylene - 17alpha - methyl - 5 - androstene-3beta,17beta-diol | 2.48 |
| 17alpha - methyl - 5 - androstene - 3beta,17beta-diol | 0.69 |
| 16-methylene-methyl-testosterone | 4.14 |
| Methyl-testosterone | 1 |
| 1 - dehydro - 16 - methylene - 17alpha - methyl-testosterone | 3.45 |
| 1-dehydro-17alpha-methyl-testosterone | 1.8 |

The oximes, 16-methylene-17alpha-methyl-testosterone-3-oxime and 16-methylene-17alpha-methyl-1-dehydro-testosterone-3-oxime, possess on oral administration the same favorable index and a still greater activity, at the average twice the activity of the corresponding 3-keto compounds.

These new compounds can produce anabolic activity in mammals by being administered either internally or externally. They can be incorporated in all the usual pharmaceutical prepartions such as pills, tablets, suppositories, emulsions, etc., and can also be suspended or solubilized for intravenous injections.

To prepare the novel compounds of this invention, reference is particularly directed to the novel process of this invention. For a rapid comprehension of this process, attention is directed to the following flowsheet:

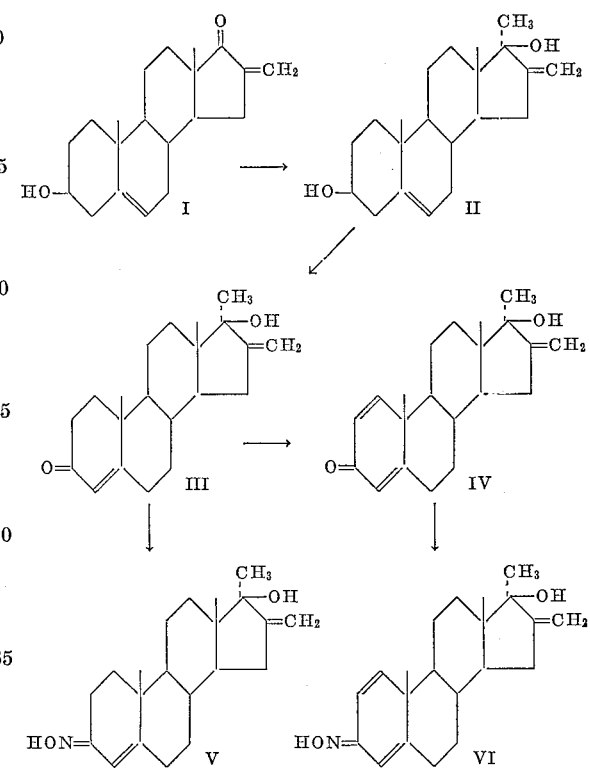

Referring to the starting material, compound I, it is possible to produce this material by a Mannich condensation of 5-androstene-3beta-ol-17-one. According to this condensation reaction, an intermediate product, 16-dimethylaminomethyl - 5 - androstene-3beta-ol-17-one, is decomposed by steam distillation to 16-methylene-5-androstene-3beta-ol-17-one which is utilized as the starting material. For a more comprehensive teaching of the Mannich condensation reaction, reference is directed to Organic Reactions, I, p. 303 (New York, 1942).

To convert the starting material to compound II, 16-methylene - 17alpha - methyl-5-androstene-3beta-,17beta-diol, it is preferred to employ either an alkali methyl or a methyl magnesium halogenide. Compound II can then be converted to compound III, 16-methylene-17alpha-methyltestosterone, by either mild chemical or biochemical oxidation, preferably by the Oppenauer oxidation, or by treatment with a culture of Flavobacterium dehydrogenans. To obtain compound IV, 16-methylene-17alpha-methyl-1-dehydro-testosterone, compound III is subjected to conventional chemical or biochemical dehydrogenation methods. Furthermore, compounds III and IV can be converted to their corresponding 3-oximes by conventional techniques.

More explicit details of the preceding reactions are given in the following description:

The conversion of the 17-keto group of compound I to a 17beta-hydroxyl group and a 17alpha-methyl group is preferably conducted by treatment with lithium methyl as the alkali methyl, or methyl magnesium bromide as the methyl magnesium halogenide. When lithium methyl is employed, it is advisable to conduct the reaction in an anhydrous medium such as benzene, ether, or tetrahydrofuran. The lithium methyl is then added to said solvent at room temperature, and the reaction is completed by permitting the reaction mixture to stand at room temperature for a sufficient period of time (overnight) or to heat it at reflux for a shorter period of time. Water is then added to the reaction mixture, and subsequently, the product is extracted with an immiscible solvent such as ether. From the ethereal solution, compound II can be isolated in the usual manner. It is apparent that there is no critical ratio of lithium methyl to the starting material, but it is preferable to employ an excess of lithium methyl to produce a higher yield.

If the methyl substituent is introduced into the starting material by grignardization, i.e. methyl magnesium bromide, it is advisable to utilize a suitable solvent such as tetrahydrofuran, benzene, or toluene, and to add an ethereal solution of methyl magnesium bromide to said solvent. This reaction is rather slow at room temperature, and therefore it is preferred to complete the reaction by reflux, and to also distill the ether from the reaction mixture before refluxing it. The time for completing the reaction is about 2–7 hours, depending upon the particular solvent that is employed. Again, the ratio of reactants is not critical, but an excess of the Grignard's agent is preferred. The product can be separated from the reaction mixture in the usual manner.

The conversion of compound II to compound III includes the oxidation of the 3beta-hydroxyl group to a 3-keto group, and a simultaneous izomerization of the 5–6 double bond to the 4–5 position. This conversion can be conducted by either biochemical or chemical means, the best and preferred chemical method being the Oppenauer oxidation. This latter oxidation can be conducted by dissolving compound II in a suitable solvent such as toluene and then reacting it with aluminum isopropylate in the presence of cyclohexanone. The reaction is conducted under reflux conditions, and upon termination of the reaction, it is preferable to perform a steam distillation and then extract the resulting residue with ether. The product, 16-methylene-17alpha-methyl-testosterone, compound III, can then be crystallized from the ether extract in the usual manner. The ratio of reactants may vary widely in this case, but it is preferred to employ a mol ratio of cyclohexanone to aluminum isopropylate of about 1 to 0.07, respectively, and a mol ratio of compound II to aluminum isopropylate of about 1 to 2.6, respectively.

Compound III is also produced from compound II biochemically, e.g., by the effect of a culture of Flavobacterium dehydrogenans. As the nutrient solution for the culture of this microorganism, a solution of one percent yeast extract in water buffered to pH 7.0 is employed. After the culture is grown for 10 to 16 hours at about 28° C., compound II is added to the culture. The incubation is then continued under ventilation for about 6 hours. By measuring the ultraviolet absorption of the products, the reaction can be controlled so that it is terminated at the right time. After completion of the fermentation, the 16 - methylene-17alpha-methyl-testosterone, compound III, is separated by extracting with chloroform and then crystallized by evaporating the chloroform from the extxract.

In addition to Flavobacterium dehydrogenans, it is also possible to employ B. Corynebacterium for the biochemical oxidation. When the latter bacteria is employed, a 1–2 dehydration takes place simultaneously, so that from 16 - methylene - 17alpha - methyl - 5 - androstene - 3beta, 17beta-diol it is possible to obtain 16-methylene-1-dehydro-17alpha-methyl-testosterone in one reaction step. A particularly suitable nutrient medium for the Corynebacterium is yeast extract.

To convert compound III to compound IV, it is necessary to dehydrogenate the 1–2 position of compound III to leave a double bond at said position. This reaction can be conducted either chemically or biochemically. Selenium dioxide, for example, can be employed as the chemical dehydrogenation agent. Prior to treating with selenium dioxide, however, it is desirable to acylate and particularly to acetylate the 17beta-hydroxyl group of the 16-methylene-17alpha-methyl-testosterone material. After the 1–2 dehydrogenation, the 17 hydroxyl group can be liberated again in the usual manner by hydrolysis, for example. Preferably, the dehydrogenation is conducted with selenium dioxide in a solution of tertiary butanol to which a small quantity of acetic acid has been added. The mol ratio of compound III to selenium dioxide can be varied widely, but it is preferred to utilize a mol ratio of one mol of compound III to 1.5 to 2.5 mols to selenium dioxide. The reaction is conducted at reflux conditions for about 48 hours, and a high yield is obtained. The precipitated selenium impurity is separated from the filtrate of the 1–2 dehydrogenation products.

The dehydrogenation reaction can also be conducted by utilizing 2,3 - dichloro-5,6-dicyano-benzoquinone as the dehydrogenation agent. When using this particular substance, it is preferable that the reaction be conducted in the presence of a solvent having a boiling point of about 30–150° C. As preferred solvents, there can be used: ethanol, butanol, tert.-butyl acetic acid methyl ester, butyl acetic acid ethyl ester, dioxane, glacial acetic acid, benzene, tetrahydrofuran, acetone, and others. It is further preferable to add small quantities of nitrobenzene to the reaction mixture. The ratio of the benzoquinone to the steroid can be varied widely, the preferred mol ratio being about 1 mol of the steroid compound to 1.1 to 3 mols of the benzoquinone derivative. As to the nitrobenzene, about 0.1 to 1 mol is added to each mol to the steroid. Depending upon the particular solvent employed, the reaction generally consumes approximately 5–48 hours for complete reaction. The reaction temperature is preferably the boiling point of the particular solvent that is employed.

To dehydrogenate the steroid at the 1–2 position by biochemical method, cultures of the following microorganisms can be used: *Baccillus sphaericus, Fusarium solani, Corynebacterium simplex,* Alternaria sp., *Mycobacterium smegmatis, Calonectria decora, Mycobacterium lacticola,* Ophiobolus sp., Alcanigenes sp., *Didymella lycopersici,* Protaminobacter sp., *Septomyxa affinis,*

Nocardia sp., *Cylindrocarpon radicicola*, *Streptomyces lavendulae*, *Bacillus Cyclooxydans*. The average duration of the biochemical 1-2 dehydrogenation is about 4 to 24 hours, depending upon which particular microorganism is employed. Particularly suitable cultures for this reaction are *Bacillus sphaericus* var. *fusiformis* or *Corynebacterium simplex*.

It is also possible to produce compound IV from compound I by first converting, as described supra, the 3beta-ol-5-ene system of compound I to the 3-keto-4-ene system, then to introduce the double bond in the 1-2 position according to the above methods, and only thereafter decomposing the 17-keto group with an alkali methyl or methyl magnesium halogenide. However, this reaction does not produce as high yields as the reaction just described; because in the last step (treatment with the alkali methyl or the grignard) the keto group in the 3-position is also attacked, and by-products are thereby produced.

Compound III and compound IV can be converted to their corresponding oximes V and VI by the conventional methods. For example, the reaction can be successfully conducted with hydroxylamine hydrochloride in either an alcoholic solution or in pyridine. The alcoholic solution preferably includes either methanol or ethanol among other common alcohols. It is also advisable to add sodium acetate when alcoholic solutions are employed. Obviously, it is preferable to employ an excess of the hydroxylamine hydrochloride in order to obtain high conversion rates. This particular reaction can be conducted at 50 to 120° C. and for about 1 to 5 hours to obtain satisfactory yields.

It is to be appreciated that the foregoing description of the reactions which are utilized to produce the novel steroids of this invention is adequate to teach a steroid chemist skilled in the art how to produce the novel compounds of this invention. The following examples, therefore, are merely preferred specific embodiments of this invention, and are not intended to be limitative of the specification and appended claims.

*Example 1*

15 grams of 16-methylene-5-androstene-3beta-ol-17-one are dissolved in 800 ml. of absolute tetrahydrofuran; and this solution is mixed with 958 ml. of a lithium methyl solution containing 5.48 g. lithium methyl. After allowing the reaction mixture to stand overnight, it is diluted with water. The ethereal phase is separtaed, and the aqueous phase is again extracted with ether. The combined ethereal solutions are then washed with water, dried and concentrated. From this concentrate there is obtained crystalline 16-methylene-17alpha-methyl-5-androstene-3-beta,17beta-diol having a melting point of 180–181° C., and an (alpha)$_D$ value of —136° (dioxane).

*Example 2*

4 grams of 16-methylene-17alpha-methyl-5-androstene-3beta,17beta-diol are dissolved in 315 ml. toluene and 51 ml. cyclohexanone. Thereafter, 30 ml. of this mixture are distilled off, and to the remaining mixture is added 6.6 g. of aluminum isopropylate. The reaction mixture is then boiled for one hour at reflux. Subsequently, the mixture is subjected to steam distillation, and the residue is then extracted with ether. The ether extract is then washed, dried, and concentrated. From cyclohexane there is crystallized the 16-methylene-17alpha-methyl-testosterone having a melting point of 149–150° C.; and (alpha)$_D$ —5° (dioxane), $\lambda_{max.}$ 240 m$\mu$, $E_{1\,cm.}^{1\%}$ 569

*Example 3*

A small fermenter containing 10 liters of a nutrient solution which contains 1% Basamin Bush and 1/16 of a mol of phosphate buffer according to Sorensen at a pH of 6.8, is inoculated with 400 ml. of a culture of Flavobacterium dehydrogenans which has been agitated for 24 hours. After a 10 hour growth at 28° C. under vigorous conditions of agitation and aeration, a solution of 5 g. of 16-methylene-17alpha-methyl-5-androstene - 3beta,17beta-diol in 150 cc. of methanol is added. The incubation and aeration continues for 6 more hours, and during this time the course of the reaction is checked by hourly measurement of the ultraviolet absorption extinction at 240 m$\mu$. After 6 hours, only 16-methylene-17alpha-methyl-testosterone can be identified. The culture media is then extracted several times with chloroform, the chloroform extract being then dried and concentrated. The 16-methylene-17alpha-methyl-testosterone as described in Example 2 is then crystallized from the concentrate.

*Example 4*

5 grams of 16-methylene-17alpha-methyl-testosterone are dissolved in 50 ml. alcohol, and mixed with 17 g. of hydroxylamine hydrochloride in 2.5 ml. water and 6.1 g. sodium acetate in 5 ml. water. The reaction mixture is boiled for one hour under reflux conditions, then poured into water, and a precipitate of raw 16-methylene-17alpha-methyl-testosterone-3-oxime is removed from the slurry by suction, and then dried. The oxime is then recrystallized from methanol, and is purified thereby, and found to have the following properties: melting point 235–237° C.;

(alpha)$_D$ +47.3° (dioxane), $\lambda_{max.}$ 240 m$\mu$, $E_{1\,cm.}^{1\%}$ 587

*Example 5*

Into a small fermenter containing 15 liters of a nutrient solution of a 1% yeast extract at a pH of 6.8 is added an inoculant of 0.5 liter of an agitated culture of *Bacillus sphaericus*. The culture is then grown under constant and vigorous agitation and aeration at 28° C., and after about 6 hours, there is added 7.5 g. of 16-methylene-17alpha-methyl-testosterone dissolved in 300 ml. of methanol. The progress of the dehydrogenation is followed by the technique of thin layer chromatography, and the reaction is found to be completed after about 20 hours. Thereafter, the fermentation solution is extracted several times with chloroform, the chloroform extracts being then dried and concentrated. From the concentrate there is crystallized 16-methylene-1-dehydro-17alpha-methyl-testosterone having a melting point of 147–148° C.;

(alpha)$_D$ —101.3° (dioxane), $\lambda_{max.}$ 244 m$\mu$, $E_{1\,cm.}^{1\%}$ 550

*Example 6*

Into a small fermenter containing 15 liters of a nutrient solution of 0.1% yeast extract at a pH of 6.8 there is added an inoculant of 1 liter of an agitated culture of *Corynebacterium simplex*. The culture is grown under constant and vigorous conditions of agitation and aeration at 28° C., and after about 6–8 hours, there is added 5 grams of 16-methylene-17alpha-methyl-testosterone in 300 ml. methanol. As described in Example 5, thin layer chromatography is employed to follow the course of the reaction. The dehydrogenation is generally completed after 8–10 hours. The culture media is then processed as described in Example 5 in order to isolate the 16-methylene-1-dehydro-17alpha-methyl-testosterone.

*Example 7*

5 grams of 16-methylene-1-dehydro-17alpha-methyl-testosterone are converted to the corresponding 16-methylene-1-dehydro-17alpha - methyl - testosterone-3-oxime in the same manner as described in Example 4, the only difference being that the reaction time in this case is three hours longer. As recrystallized from methanol the pure product has the following properties: melting point 209–213° C.;

(alpha)$_D$ —34.6° (dioxane), $\lambda_{max.}$ 245 m$\mu$, $E_{1\,cm.}^{1\%}$ 488

Example 8

Into a small fermenter containing 12 liters of a nutrient solution of 0.1% yeast extract at a pH of 6.8 are added 800 ml. of an inoculant comprising a submerged culture of *Corynebacterium simplex*. The culture is then grown under vigorous agitation and aeration at 28° C., and after about 8 hours, there is added 8 grams of 16-methylene-17alpha-methyl-15-andostrene-3beta,17beta-diol in 250 ml. methanol. The reaction is monitored by the technique of thin layer chromatography, and is completed after 10–12 hours. As an intermediate product, 16-methylene-17alpha-methyl-testosterone is discovered, but it is thereupon further dehydrogenated to 16-methylene-1-dehydro-17alpha-methyl-testosterone. The upgrading of the fermentation products is conducted in the same manner as in Example 5.

From the foregoing description, one skilled in the art can readily appreciate the essential characteristics of this invention, and without departing from the spirit and scope of these essential characteristics, one can modify and adapt this invention to various usages and conditions. Consequently, such modifications and adaptations should, and are intended to be within the full range of equivalence of the following claims.

What we claim is:

1. 16-methylene-17alpha-methyl-5-androstene-3beta,17beta-diol.
2. 16-methylene-17alpha-methyl-1-dehydro-testosterone.
3. 16-methylene-17alpha-methyl-testosterone-3-oxime.
4. 16-methylene-17alpha-methyl-1-dehydro-testosterone-3-oxime.
5. A process of producing anabolic activity in a mammal which comprises administering 16-methylene-17alpha-methyl-5-androstene-3beta,17beta-diol to said mammal.
6. A process of producing anabolic activity in a mammal which comprises administering 16-methylene - 17alpha-methyl-1-dehydro-testosterone to said mammal.
7. A process of producing anabolic activity in a mammal which comprises administering 16-methylene-17alpha-methyl-testosterone-3-oxime to said mammal.
8. A process of producing anabolic activity in a mammal which comprises administering 16-methylene-17alpha-methyl-1-dehydro-testosterone-3-oxime to said mammal.

References Cited in the file of this patent

UNITED STATES PATENTS

| | | |
|---|---|---|
| 2,666,016 | Hechter et al. | Jan. 12, 1954 |
| 2,756,179 | Fried et al. | July 24, 1956 |
| 2,890,227 | Mancera et al. | June 9, 1959 |
| 2,900,398 | Wettstein et al. | Aug. 18, 1959 |
| 2,929,763 | Wettstein et al. | Mar. 22, 1960 |
| 2,960,513 | Thoma et al. | Nov. 15, 1960 |
| 2,969,379 | Babcock et al. | Jan. 24, 1961 |
| 2,991,295 | Magerlein et al. | July 4, 1961 |
| 3,019,244 | Babcock et al. | Jan. 30, 1962 |
| 3,023,206 | Burn et al. | Feb. 27, 1962 |